United States Patent
Vu

(10) Patent No.: US 8,788,416 B1
(45) Date of Patent: Jul. 22, 2014

(54) ADVANCE PAYMENT NOTICE TO FINANCIAL INSTITUTIONS

(75) Inventor: Miriam Nga-Shun Vu, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 597 days.

(21) Appl. No.: 12/609,931

(22) Filed: Oct. 30, 2009

(51) Int. Cl.
- *G06Q 40/00* (2012.01)
- *G06Q 20/10* (2012.01)
- *G06Q 20/08* (2012.01)

(52) U.S. Cl.
CPC .......... *G06Q 20/102* (2013.01); *G06Q 20/0855* (2013.01)
USPC .......................................................... 705/40

(58) Field of Classification Search
CPC  G06Q 40/025; G06Q 20/102; G06Q 20/0855
USPC ....................................................... 705/1–50
See application file for complete search history.

(56) References Cited

U.S. PATENT DOCUMENTS

| | | | | |
|---|---|---|---|---|
| 2003/0078881 | A1* | 4/2003 | Elliott et al. ..................... | 705/39 |
| 2003/0182240 | A1* | 9/2003 | Eda et al. ........................ | 705/64 |
| 2004/0024702 | A1* | 2/2004 | Angel et al. .................... | 705/40 |
| 2004/0143548 | A1* | 7/2004 | Meier et al. ..................... | 705/40 |
| 2006/0069981 | A1* | 3/2006 | Enenkiel ........................ | 715/500 |
| 2006/0149668 | A1* | 7/2006 | Zafrir .............................. | 705/39 |
| 2007/0156581 | A1* | 7/2007 | Imrey et al. ..................... | 705/39 |
| 2008/0126145 | A1* | 5/2008 | Rackley, III et al. ............. | 705/7 |
| 2009/0070244 | A1* | 3/2009 | Gallon ............................ | 705/34 |
| 2010/0250407 | A1* | 9/2010 | Silva .............................. | 705/30 |
| 2010/0250426 | A1* | 9/2010 | Silva .............................. | 705/37 |

\* cited by examiner

*Primary Examiner* — Eric T Wong
(74) *Attorney, Agent, or Firm* — Osha Liang LLP

(57) ABSTRACT

A method for transmitting information with a financial institution. The method includes receiving a request from the financial institution for the information associated with scheduled future payment related to an established destination account and including a capital amount scheduled to be transferred to the financial institution, where the established destination account is associated with credit extended by the financial institution, performing, using a central processing unit (CPU), a search for the information on an intermediary data repository not controlled by the financial institution and based on the request, obtaining a portion of the information from the intermediary data repository based on the search, extracting, using the CPU, the portion of the information from the intermediary data repository to obtain a result, and transmitting the result to the financial institution to notify the financial institution of the scheduled future payment to the financial institution to be credited to the established destination account.

25 Claims, 7 Drawing Sheets

| Scheduled Future Payment Application Account # | Generation Date | Financial Institution | Financial Institution Account # | Routing # of Financial Institution Account | Financial Institution Transmission Type | Financial Institution Transmission Information | Scheduled Future Payment Amount | Scheduled Future Payment Date / Time | Date / Time Scheduled | Current Account Balance | Expected Account Balance |
|---|---|---|---|---|---|---|---|---|---|---|---|
| 472104710 | 06/01/08 | Bank A | 87694762790 | 8390300001 | electronic link | 1000422753 | $204.36 | 08/30/2009 09:00:00 | 08/30/2009 06:00:00 | $54.52 | $104.52 |
| 472104710 | 02/15/09 | Bank B | 3415415635-8A | 3242164490 | email | scheduledpayments@bankB.com | $100.00 | 08/15/2009 12:00:00 | 08/12/2009 14:25:31 | $54.52 | $104.52 |
| 567309672 | 01/26/07 | CC Co. C | Z867674562 | 3862077673 | electronic link | 6936445342322 | $58.17 | 09/02/2009 06:30:00 | 06/15/2008 10:01:52 | $2,289.12 | $2,289.12 |
| 342419076 | 04/12/07 | Mortgage Co. D | ALFND003514 | 5634722390 | email | scheduledpayments@mortgagecoD.com | $95.00 | 09/14/2009 17:00:00 | 06/18/2007 12:30:35 | $1,029.40 | $984.20 |

205 Intermediary Data Repository

FIG. 2

| | Week 1 410 | Week 2 412 | Week 3 414 | Week 4 416 | Week 5 418 |
|---|---|---|---|---|---|
| Customer A 402 | Customer A on Bank list, Bank contacts Customer A Example 420 | Customer A schedules payment to Bank for due date Example 422 | Customer A reschedules payment to Bank ahead of due date Example 424 | Customer A reschedules payment to Bank for amount greater than amount due, Customer A taken off Bank list Example 426 | Customer A not on Bank list, Bank does not contact Customer A Example 428 |
| Customer B 404 | Customer B not on Bank list, Bank does not contact Customer B Example 430 | Customer B schedules payment to Bank for due date Example 432 | Customer B cancels scheduled payment, Customer B put on Bank list Example 434 | Customer B reschedules scheduled payment for after due date Example 436 | Customer B on Bank list, Bank contacts Customer B Example 438 |
| Customer C 406 | Relative of Customer C on Bank list, Bank contacts relative of Customer C Example 440 | Customer C schedules payment to Bank before due date, Relative of Customer C taken off Bank list Example 442 | Customer C reschedules payment to Bank for amount less than amount due, Relative of Customer C put on Bank list Example 444 | Customer C reschedules payment to Bank for amount greater than amount due, Relative of Customer C taken off Bank list Example 446 | Relative of Customer C not on Bank list, Bank does not contact relative of Customer C Example 448 |

FIG. 4

ADVANCE PAYMENT NOTICE TO FINANCIAL INSTITUTIONS

BACKGROUND

Bill pay systems are widely used by customers of financial institutions to schedule recurring payments to various recipients. A typical bill pay system allows a customer to schedule and keep track of payments to numerous recipients using a single web site, with a single login. The payments may be one time payments or recurring. Usually customers can make payments to any recipient that they would otherwise be able to make a payment to with a check. If the bill pay system is administered by a financial institution, it may provide the option of making payments from multiple accounts of that financial institution (e.g. checking, savings, credit card, home equity line of credit, personal line of credit, and the like). Bill pay allows customers the ability to make payments that are guaranteed to be sent on time and without delay.

Financial institutions that extend loans and lines of credit to customers often track the behavior of customers. For example, a financial institution may keep track of how many times a customer has made late payments on a line of credit associated with a credit card, or how many times a customer has not paid the outstanding balance of a credit card account. These types of actions may indicate to the financial institution that the customer has a high risk profile, or is at a high risk of defaulting on their credit or performing some other objectionable action. In response to such events, financial institutions may contact customers in order to incentivize them to make their payments on time and in full. Often times, financial institutions may unnecessarily contact customers even when they are going to make their upcoming payment(s) on time. In difficult economic times, financial institutions attempt to reduce as much of the credit and default risk associated with customers as possible.

SUMMARY

In general, in one aspect, the invention relates to a method for transmitting information associated with a scheduled future payment to a financial institution. The method includes receiving a request from the financial institution for the information associated with the scheduled future payment, related to an established destination account at the financial institution, and comprising a capital amount scheduled to be transferred to the financial institution at a future calendar date, wherein the established destination account is associated with credit extended by the financial institution, performing, using a central processing unit (CPU), a search for the information on an intermediary data repository not controlled by the financial institution and based on the request, obtaining a portion of the information from the intermediary data repository based on the search, extracting, using the CPU, the portion of the information from the intermediary data repository to obtain a result, and transmitting the result to the financial institution to notify the financial institution of the scheduled future payment to the financial institution to be credited to the established destination account.

In general, in one aspect, the invention relates to a system for transmitting information associated with a scheduled future payment to a financial institution. The system includes a central processing unit (CPU), a scheduled payment application executing on the CPU and comprising a scheduled payment input module configured to receive a request from the financial institution for the information associated with the scheduled future payment, related to an established destination account at the financial institution, and comprising a capital amount scheduled to be transferred to the financial institution at a future calendar date, wherein the established destination account is associated with credit extended by the financial institution, an intermediary data repository coupled to the scheduled payment input module, not controlled by the financial institution, and configured to perform a search for the information based on the request, obtain a portion of the information based on the search, extract the portion of the information to obtain a result, and a scheduled payment notification module coupled to the intermediary data repository and configured to transmit the result to the financial institution to notify the financial institution of the scheduled future payment to the financial institution to be credited to the established destination account.

In general, in one aspect, the invention relates to a computer readable medium storing instruction to transmit information associated with a scheduled future payment to a financial institution, the instructions executable on a central processing unit and comprising functionality to receive a request from the financial institution for the information associated with the scheduled future payment, related to an established destination account at the financial institution, and comprising a capital amount scheduled to be transferred to the financial institution at a future calendar date, wherein the established destination account is associated with credit extended by the financial institution, perform a search for the information on an intermediary data repository not controlled by the financial institution and based on the request, obtain a portion of the information from the intermediary data repository based on the search, extract the portion of the information from the intermediary data repository to obtain a result, and transmit the result to the financial institution to notify the financial institution of the scheduled future payment to the financial institution to be credited to the established destination account.

Other aspects and advantages of the invention will be apparent from the following description and the appended claims.

BRIEF DESCRIPTION OF DRAWINGS

FIGS. 1 and 2 show systems in accordance with one or more embodiments of the invention.

FIGS. 4 and 5 show examples in accordance with one or more embodiments of the invention.

DETAILED DESCRIPTION

Figure 1:
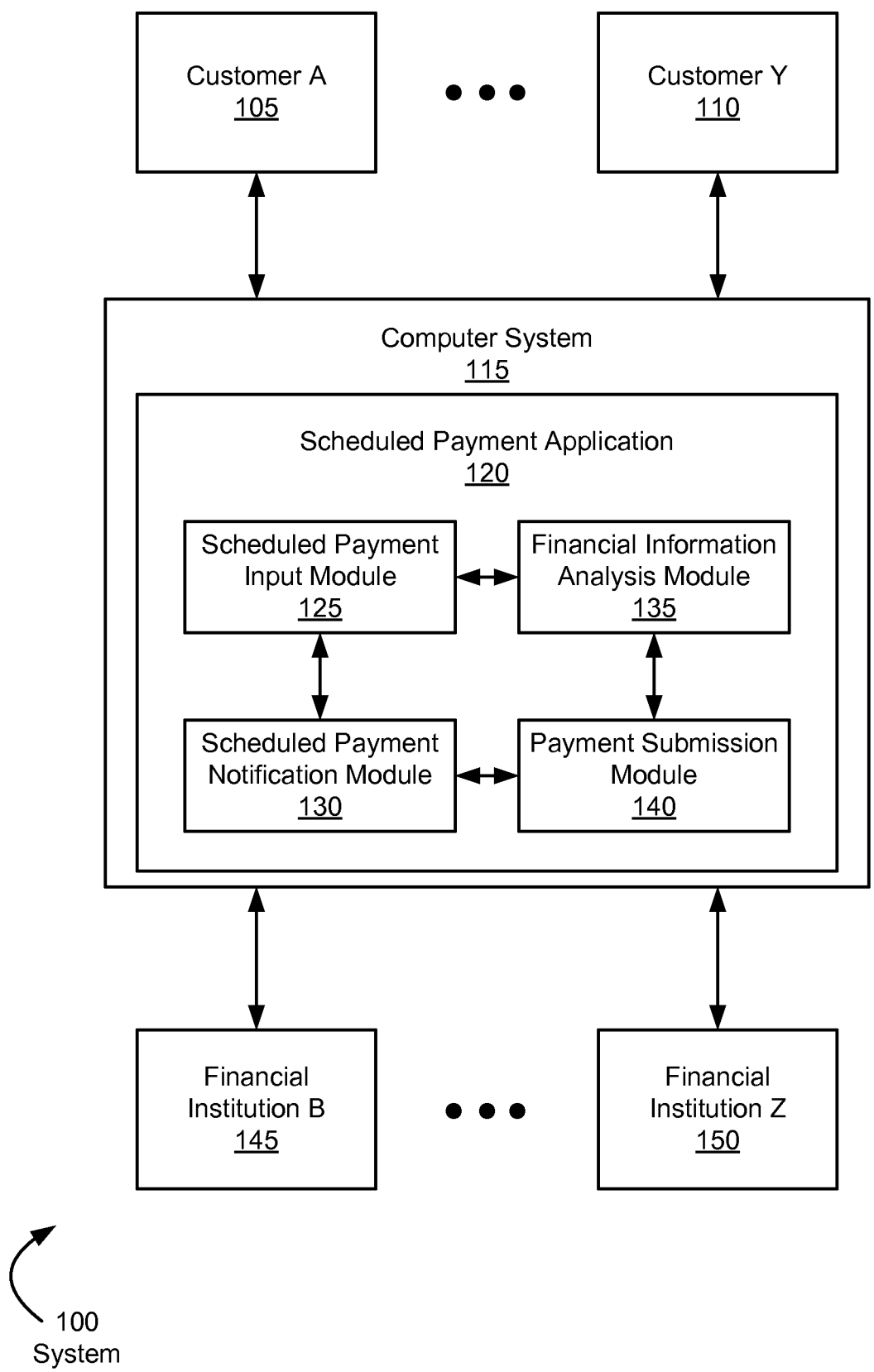

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for transmitting information associated with a scheduled future payment to a financial institution. In general, embodiments of the invention provide a system and method for transmitting creditworthiness analysis to a financial institution. In general, embodiments of the invention provide a system and method for urgently transmitting information associated with a scheduled future payment to a financial institution.

FIG. 1 shows a system (100) in accordance with one or more embodiments of the invention. As shown in FIG. 1, the system (100) includes multiple components such as a computer system (115), a scheduled payment application (120) containing a scheduled payment input module (125), a scheduled payment notification module (130), a financial information analysis module (135), and a payment submission module (140). A single customer or multiple customers (e.g. customer A (105) and customer Y (110)) may interface with system (100). Additionally, a single financial institution or multiple financial institutions (e.g. financial institution B (145) and financial institution Z (150)) may also interface with system (100). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one scheduled payment application (120) and associated modules running on a device, as well as more than one customer and financial institution interfacing with those components.

Figure 6:
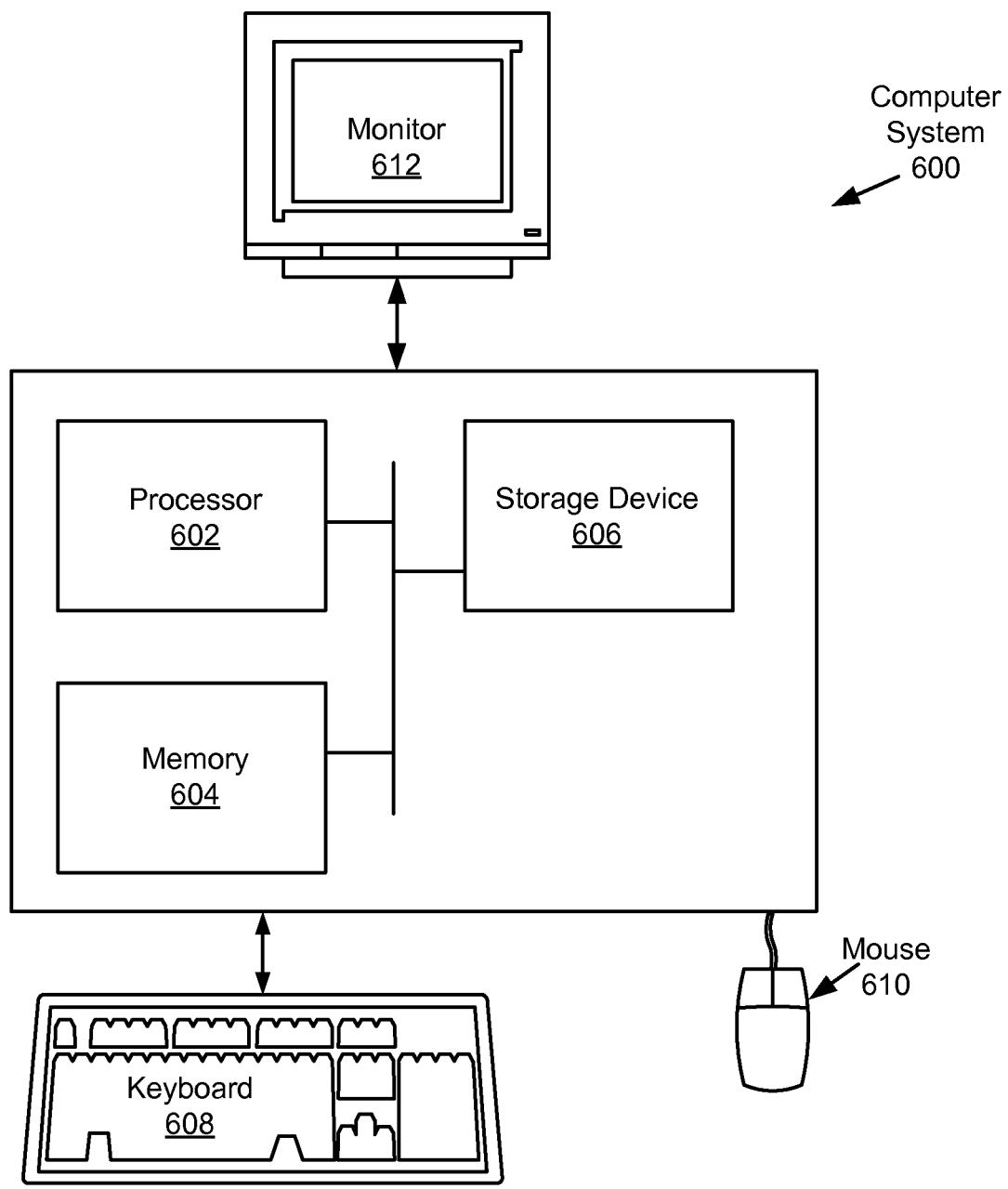
FIG. 6 shows a computer system in accordance with one or more embodiments of the invention.

In one or more embodiments of the invention, the computer system (115) may be a computer system similar to the one described in FIG. 6, and may execute the scheduled payment application (120), and/or be used to submit (e.g. transmit) information associated with a scheduled future payment to a financial institution. Please refer to the description of FIG. 6 for details regarding one embodiment of the computer system.

In one or more embodiments of the invention, a scheduled payment application (120) may be configured to contain a scheduled payment input module (125), a scheduled payment notification module (130), a financial information analysis module (135), and a payment submission module (140), and may perform operations associated with the transmission of scheduled future payment information to a financial institution. Those skilled in the art will appreciate that the scheduled payment application (120) may be referred to by various names, such as a scheduled future payment application. The scheduled payment application (120) may be associated with a third party entity that is not the same financial institution to which information associated with a scheduled future payment is transmitted.

In one or more embodiments of the invention, a scheduled payment input module (125) may receive input from a customer (e.g. a user, an individual, a business, a corporation, and the like) of the scheduled payment application (120). The input may describe scheduled future payment information, including a dollar amount, a date, a time, and other information pertinent to the scheduled future payment. In one or more embodiments of the invention, a graphical user interface (GUI) may display and receive information associated with the scheduled payment input module (125) to/from a customer (e.g. customer A (105)). The GUI may be viewed from within a web browser, an application window, and the like. The GUI may be viewed in these display technologies by a customer of the scheduled payment application (120). In one or more embodiments of the invention, the GUI includes standard web elements, including video, audio, and text, as well as interface technologies not limited to text submission on forms, voice capture, and user gesture interpretation. Those skilled in the art will appreciate that various other display technologies may be used by and to view the GUI in order to receive input from a customer through the scheduled payment input module (125).

In one or more embodiments of the invention, a scheduled payment notification module (130) may send notification of a scheduled future payment to a financial institution (e.g. financial institution B). In one or more embodiments of the invention, the notification may be a file created for the financial institution containing information such as customer name, account number, payment amount (e.g. minimum payment amount, statement balance), payment date, and whether the payment is to be made on a recurring basis. The file may be sent on a daily basis with updates that include changes to established scheduled payments and new scheduled payments. The content of the file may follow an established format (e.g. what fields and in what order) that is agreed upon between the financial institution and the third party entity. The file is transmitted securely since the file contains sensitive information such as account numbers. File creation may also be performed on a nightly basis and transmitted to the financial institution. Those skilled in the art will appreciate that there may be numerous other types of notifications transmitted to the financial institution.

The transmission of such data may occur via email, a dedicated electronic line, a web page, physical delivery, and various other delivery mechanisms. The scheduled payment notification module (130) may be linked to the scheduled payment input module (125), the financial information analysis module (135), the payment submission module (140), an intermediary data repository (e.g. intermediary data repository (205)), as well as one or more financial institutions. Those skilled in the art will appreciate that the delivery mechanisms associated with the scheduled payment notification module (130) are not restricted to only those described above.

In one or more embodiments of the invention, a financial information analysis module (135) may be configured to perform an analysis of financial information associated with the scheduled payment to be sent to a financial institution (e.g. financial institution Z). Please refer to the description of FIG. 5 for details regarding the analysis of financial information.

In one or more embodiments of the invention, a payment submission module (140) is configured to submit a payment to a financial institution. The payment may be associated with a previously transmitted scheduled payment. The payment submission module (140) may use various technologies to transmit a payment or recurring payments to a financial institution, including bill pay, wire transfer, and the like. Those skilled in the art will appreciate that the payment submission module (140) may use various technologies to transmit a payment not described above.

FIG. 2 shows an exemplary data structure stored in an intermediary data repository (205) in accordance with one or more embodiments of the invention. The intermediary data repository (205) shown in FIG. 2 may be used, for example, with system (100), to transmit information associated with a scheduled future payment to a financial institution. Those skilled in the art will appreciate that the intermediary data repository (205) shown in FIG. 2 may differ among embodiments of the invention, and that one or more of the elements of the intermediary data repository (205) may be optional.

In one or more embodiments of the invention, intermediary data repository (205) may contain data associated with the scheduled payment application (120). In one or more embodiments of the invention, the intermediary data repository (205) is a relational database that stores data entries associated with the scheduled payment application (120). The intermediary data repository (205) may also be a spreadsheet containing data cells associated with the scheduled payment application (120), and/or a flat text file containing strings associated with scheduled future payment information. Those skilled in the art will appreciate that the intermediary data repository (205) may be implemented with many technologies while still complying with the spirit of the invention.

In one or more embodiments of the invention, intermediary data repository (205) of FIG. 2 may contain various data elements associated with a scheduled future payment, such as a scheduled future payment application account # (210), generation date (215), financial institution (220), financial institution account # (225), routing # of financial institution account (230), financial institution transmission type (235), financial institution transmission information (240), scheduled future payment amount (245), scheduled future payment date/time (250), date/time scheduled (255), current account balance (260), and expected account balance (265). A scheduled future payment application account # element (210) (e.g. a nine digit integer) may detail an account number associated with the scheduled future payment application. A generation date element (215) (e.g. in a month/day/year format) may detail the date the set of information associated with the data repository row was generated by a third party. A financial institution element (220) (e.g. bank X) may detail the name of the bank associated with the scheduled future payment. A financial institution account # element (225) (e.g. an encrypted alphanumeric string) may detail an account number of an account at the financial institution associated with the scheduled future payment. A routing # of financial institution account element (230) (e.g. an encrypted nine digit integer) may detail the routing number required to perform wire transfers to and automatic bill-pay transactions with the financial institution.

In one or more embodiments of the invention, a financial institution transmission type element (235) (e.g. via electronic link, email, physical delivery, a web page) may detail the method of transmission of information related to the scheduled future payment to the financial institution. A financial institution transmission information element (240) (e.g. an email address, verification code, or other encrypted data) may detail information associated with the financial institution transmission type. A scheduled future payment amount element (245) (e.g. a $US amount) may detail a monetary amount of the scheduled future payment. A scheduled future payment date/time element (250) (e.g. in a month/day/year and hour/minute/second format) may detail the date and time that the scheduled future payment is scheduled to be transmitted to the financial institution. A date/time scheduled element (255) (e.g. in a month/day/year and hour/minute/second format) may detail a date and time when the future schedule payment was scheduled in the scheduled future payment application. A current account balance element (260) (e.g. a $US amount) may detail a monetary balance of an account associated with the scheduled future payment. An expected account balance element (265) (e.g. a $US amount) may detail an expected monetary balance of an account associated with the scheduled future payment. The intermediary data repository (205) may also contain other data elements relating to modification of scheduled future payments, such as a log of canceled payments (not shown), or payments that have been rescheduled from a particular scheduled date to another date (not shown). Those skilled in the art will appreciate that there may be various other data elements in the intermediary data repository (205).

Figure 3A:
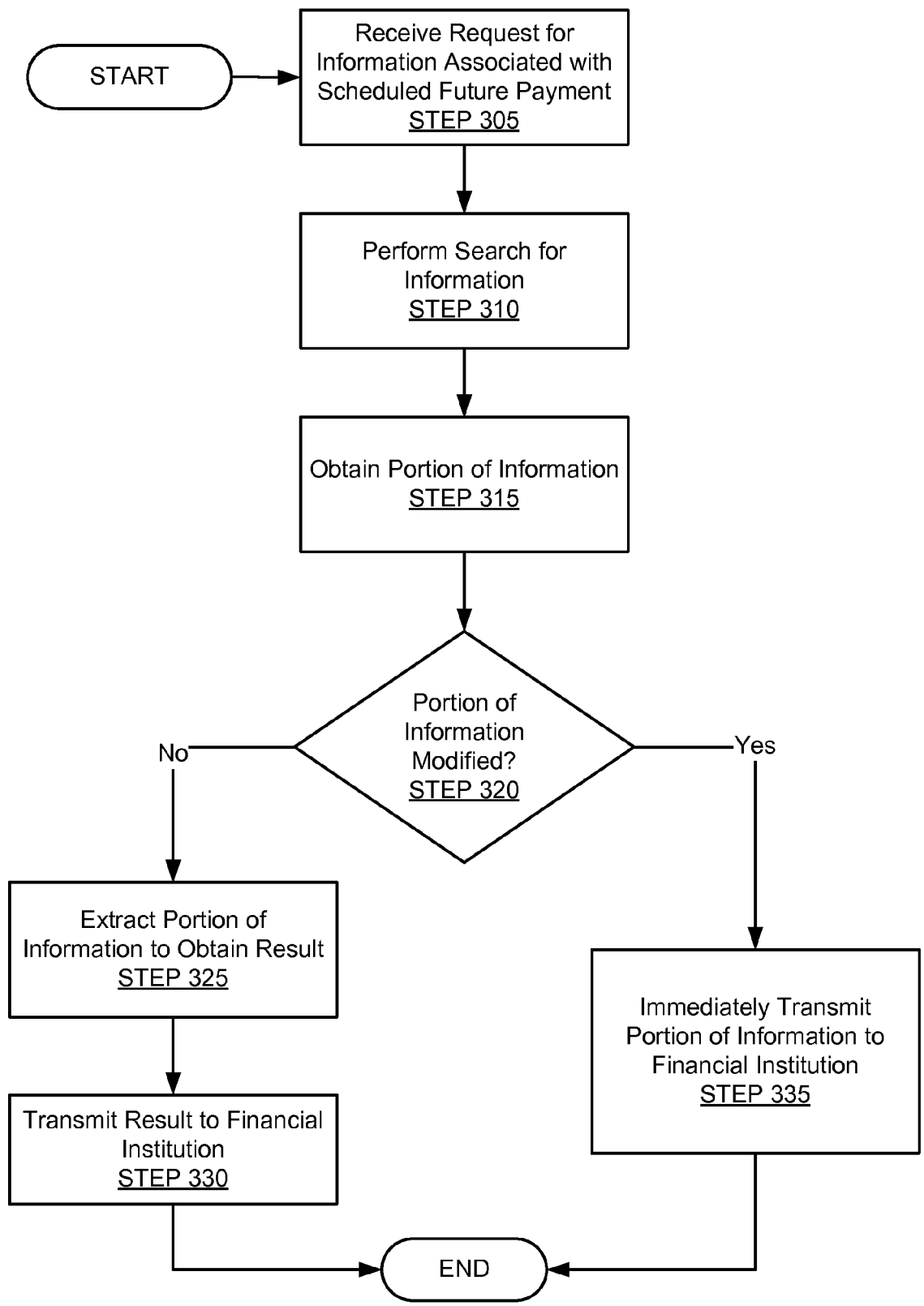
FIGS. 3A and 3B show flowcharts in accordance with one or more embodiments of the invention.

FIG. 3A shows a flowchart in accordance with one or more embodiments of the invention. The flowchart shown in FIG. 3A may be used, for example, with the system (100 in FIG. 1), to transmit information associated with a scheduled future payment to a financial institution. Those skilled in the art will appreciate that the sequence of steps shown in FIG. 3A may differ among embodiments of the invention, and that one or more of the steps of the flowchart may be optional.

In STEP 305, a request for information associated with a scheduled future payment may be received. The request for the information may originate from a financial institution (e.g. financial institution B). The request may be related to an established destination account at the financial institution. The established destination account may be associated with credit extended (e.g. a loan provided to a customer) by the financial institution (e.g. through a credit card account). The scheduled future payment may be associated with a capital amount (e.g. a US dollar amount) scheduled to be transferred to the financial institution at a future calendar date (e.g. a date in the future based on the time the request is made). The request may be transmitted from the financial institution to the scheduled payment application (120 in FIG. 1) using various methods, including email, electronic transmission, web page based transmission, voice transmission, and the like. The request may be for information associated with a single scheduled future payment or multiple scheduled future payments.

In STEP 310, a search for the information may be performed. The search may be performed by the scheduled future payment application (120 in FIG. 1), in an intermediary data repository (205 in FIG. 2). The search may be performed according to the specific customer(s), the specific payment due date(s), the specific payment amount(s), and the like. Those skilled in the art will appreciate that there may be various other metrics upon which the search is structured, and that the financial institution or the scheduled payment application (120 in FIG. 1) may determine these metrics. Please see the description of FIG. 2 for details about the intermediary data repository (205).

In STEP 315, a portion of the information may be obtained. The portion of the information may be obtained from the intermediary data repository. The portion of the information may be a subset or a full set of information related to the search. For example, if the intermediary data repository does not include some of the requested information that is not required by the financial institution, then a subset of the set of information may be obtained. If the intermediary data repository contains everything requested by the financial institution, then the portion of the information may be the complete set of information requested by the financial institution.

In STEP 320, it is determined whether the portion of information obtained in STEP 315 has been modified since a predetermined prior time period. If a determination is made that the portion of information is modified, then the process proceeds to STEP 335. If a determination is made that the portion of information is not modified, then the process may proceed to STEP 325.

In STEP 325, the portion of the information may be extracted to obtain a result. The portion of the information may be extracted from the intermediary data repository. The portion of the information may further be filtered, modified, formatted, and otherwise manipulated to produce the result. For example, the portion of the information may be put into a specific format in order to match an interface of a financial institution's electronic delivery mechanism, or the portion of the information may be filtered to include only information that has been identified to be of various levels of pertinence by a financial institution. Further, the portion of the information may be modified to include metadata for use by the financial institution. Those skilled in the art will appreciate that there may be various operations performed upon the portion of the information that have not been disclosed.

In STEP 330, the result may be transmitted to a financial institution. The transmission may be performed in order to notify the financial institution of the scheduled future payment to the financial institution that is to be credited (e.g. resulting in an increase in liabilities or owners' equity or in a decrease in assets) to the established destination account. The result may be transmitted to the financial institution from the scheduled payment application using various methods, including email, electronic transmission, web page based transmission, and voice transmission. If email is the transmission method used by the scheduled future payment application and the financial institution, then an email determined by the financial institution may be used to transmit the result (e.g. scheduledpaymentinformation@bankA.com). If electronic transmission is used to transmit the result to the financial institution, then an electronic key or authentication string may be required by the financial institution (e.g. a 10 digit string). If a web page based method is used to transmit the result to the financial institution, then application programming interface (API) hooks may be required. Those skilled in the art will appreciate that there may be numerous other methods used to transmit the result to the financial institution that have not been disclosed.

In STEP 335, the portion of the information may be immediately transmitted to a financial institution. The immediate nature of the transmission indicates that it may occur much more quickly than in STEP 330. For example, the transmission of STEP 330 may occur with a predetermined frequency (e.g. once every 7 days), and the transmission of STEP 335 may occur immediately (e.g. less than a second after STEP 320). The immediate transmission of the result to the financial institution may be useful to the financial institution in cases where a customer's risk profile may be effected by the modification of the portion of the information, or if a customer's credit may be effected (adversely or beneficially).

Figure 3B:
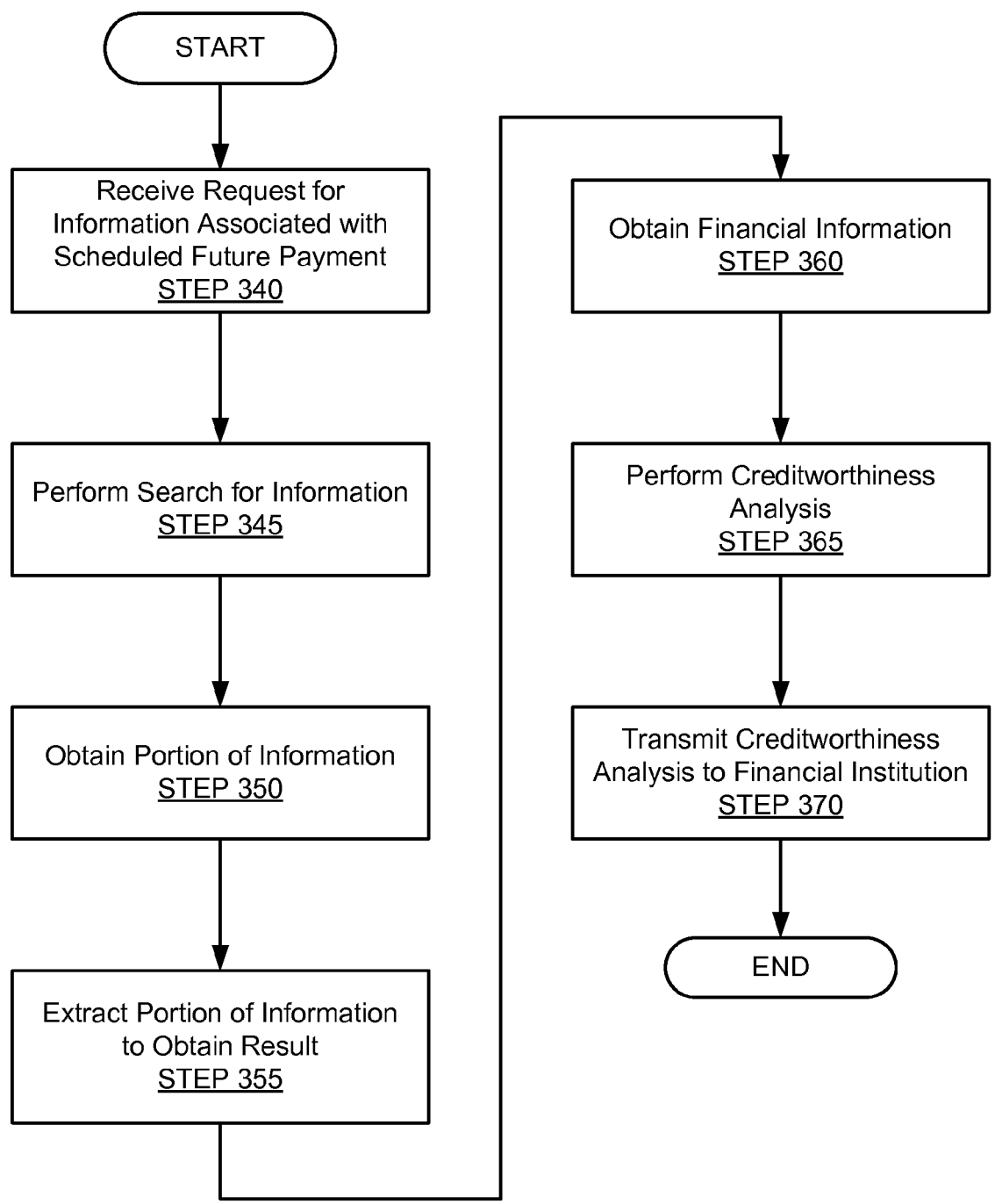

FIG. 3B shows a flowchart in accordance with one or more embodiments of the invention. The flowchart shown in FIG. 3B may be used, for example, with the system (100), to transmit a creditworthiness analysis to a financial institution. Those skilled in the art will appreciate that the sequence of steps shown in FIG. 3B may differ among embodiments of the invention, and that one or more of the steps of the flowchart may be optional.

In STEP 340, a request for information associated with a scheduled future payment may be received in the same or similar manner to that described in relation to STEP 305 above.

In STEP 345, a search for the information may be performed in the same or similar manner to that described in relation to STEP 310 above.

In STEP 350, a portion of the information may be obtained in the same or similar manner to that described in relation to STEP 315 above.

In STEP 355, the portion of the information may be extracted to obtain a result in the same or similar manner to that described in relation to STEP 325 above.

In STEP 360, financial information may be obtained. The financial information may relate to a customer's payments, the risks associated with their account and lines of credit, their payments histories, and other similar information. For example, financial information may indicate a customer's scheduled payments that have been missed in reality. Financial information may also indicate payments that have been made to a financial institution that have been greater than the scheduled amounts for those payments. The financial information may be associated with the current credit score of the customer, and may relate to whether or not a customer is likely a default risk to a financial institution. Please see the description of FIG. 5 for details regarding the financial information.

In STEP 365, a creditworthiness analysis may be performed. A creditworthiness analysis may include financial information relating to the creditworthiness of a customer of a financial institution using data associated with scheduled, actual, past, present, and future payments. Please see the description of FIG. 5 for details regarding the creditworthiness analysis.

In STEP 370, the creditworthiness analysis may be transmitted to a financial institution. Those skilled in the art will appreciate that the payment submission module may also transmit a payment to a financial institution at any point in the process described above; however, transmission of a payment to a financial institution is not required for successful transmission of the result or creditworthiness analysis to the financial institution.

In one or more embodiments of the invention, the creditworthiness analysis and future schedule payment result may provide a financial institution with a means to predict the risk profiles of customers, and to be more selective in contacting customers that may pose default risks to the financial institution. Financial institutions may benefit from a more selective customer contact process as it reduces expenses tied to human resources, infrastructure, as well as IT. Further, a view into customer's scheduling behaviors may provide financial institutions with more predicable assessments of risk and non performing assets. Those skilled in the art will appreciate that the third party that owns the scheduled payment application may provide these services to financial institutions implementing a flat fee based revenue structure, a revenue share structure, or numerous other revenue models. Further, the third party may also send the information described above to customers of the financial institution, in order to provide them with feedback on their payment and payment scheduling activities.

FIG. 4 shows an example in accordance with one or more embodiments of the invention. The process shown in FIG. 4 may be used, for example, with the system (100 in FIG. 1), to submit scheduled future payment information to a financial institution, and for that financial institution to add or remove a customer from a list. FIG. 4 demonstrates various scenarios with three customers over five weeks. Those skilled in the art will appreciate that the sequence of steps shown in FIG. 4 may differ among embodiments of the invention, and that one or more of the steps may be optional.

In the customer A example, in week 1 (410) customer A (402) is on a list (e.g. containing customer contact information) of a bank (i.e. a financial institution), and the bank contacts customer A (402) because of the presence of customer A on the list (Example 420). The list may indicate, for instance, customers that the bank holds to be credit risks (i.e. customers that the bank has determined are at risk of defaulting on their loans, or at risk of making late loan payments). Specifically, the bank may contact customer A (402) to remind customer A (402) that a credit payment is due soon, or that a credit payment has been missed.

In week 2 (412), in response to the bank contacting customer A (402), customer A (402) schedules a payment to be made to the bank for the due date of the payment (Example 422). Often, receiving a phone call or other form of communication (e.g. email, text message, fax, message with the bank's application, message within a third party social networking application, and the like) from the bank will elicit a response from the customer and modify the behavior (e.g. scheduling a payment for the due date of the payment, making a payment after a missed payment, increasing the amount of the payment, and the like) that placed him/her on the bank's list.

In week 3 (414), customer A (402) reschedules the payment that he/she previously scheduled for another date, ahead of the payment due date (Example 424). Depending on the bank's policies and customer A's payment history, this action may be enough to remove customer A (402) from the bank's list. In this case, it is not enough, as customer A (402) may have had an unfavorable history of making payments to the bank.

In week 4 (416), customer A (402) modifies the payment that customer A (402) previously scheduled (and rescheduled). Specifically, customer A (402) modifies the amount of the scheduled payment to be greater than the amount due to the bank. This modification is enough to prompt the bank to remove customer A (402) from the list of customers to contact (Example 426). This may occur, for instance, because as customer A (402) increases the scheduled payment amount, the risk profile of customer A (402) may be reduced to a point that is acceptable to the bank and beyond which the bank does not require contact with customer A (402). Subsequently, in week 5 (418), as customer A (402) is not part of the bank's list, customer A (402) is not contacted by the bank as a reminder to make a payment due to the bank (Example 428). The example of customer A (402) represents a scenario in which a customer is initially on the bank's contact list, and is subsequently removed from the contact list due to good payment scheduling behavior.

In the customer B (404) example, in week 1 (410) customer B (404) is not on the bank's contact list, and accordingly the bank does not contact customer B (404) (Example 430). Customer B (404) may not be on the list of the bank due to good payment scheduling behavior (e.g. scheduling payments on or before the due date of the payment, scheduling payments for amounts greater than the amounts due, consistent scheduling and actual payment of loans due, and the like).

In week 2 (412), customer B (404) schedules a payment to the bank for the due date of the payment (Example 432). Scheduling a payment for the due date may be perceived as good credit/low risk behavior by the bank. Further, if customer B (404) has consistently scheduled payment for on or before the due dates of the payments, he may have a low risk profile and may not be contacted by the bank very often or at all.

In week 3 (414), customer B (404) cancels the payment that he/she had previously scheduled for the due date of the payment (Example 434). This action may be interpreted by the bank as a high risk action, as canceling a previously scheduled payment may indicate that customer B (404) will not make the payment on time. Consequently, the bank may raise the risk profile of customer B (404), and puts customer B (404) on the contact list (Example 434) in order to take action with customer B (404) and attempt to have customer B (414) reschedule the payment.

In week 4 (416), customer B (404) reschedules the payment that he/she had previously canceled. This time, however, the payment is scheduled for after the due date of the payment (Example 436). This behavior may indicate to the bank that customer B (404) is a higher risk customer than he/she was previously. In response to this action, in week 5 (418), the bank places customer B (404) on the contact list, and subsequently contacts customer B (404) in the attempt to get customer B (404) to schedule the payment on or before the due date of the payment (Example 438). The example of customer B (404) represents a scenario in which a customer is initially not on the bank's contact list, and is subsequently added from the contact list due to risky payment scheduling behavior.

In the customer C (406) example, in week 1 (410) a relative of customer C (406) is on the bank's contact list. This may be due to historical scheduling and payment behavior of customer C (406) that is considered risky by the bank. In consequence to this risky behavior, the bank may have sought out the contact information of a relative of customer C (406), in the attempt to mitigate the risk associated with customer C (406) through contact with the relative of customer C (406). The bank therefore contacts the relative of customer C (406) (whether a co-signer on the account, emergency contact, or other relationship) using the contact information from the list (Example 440).

In week 2 (412), customer C (406) schedules a payment to the bank with a scheduled payment date that is before the due date of the payment. This action is viewed by the bank as a positive action that reduces the risk associated with customer C (406), and therefore the relative of customer C (406) is subsequently removed from the contact list (Example 442).

In week 3 (414), customer C (406) reschedules the payment amount to be an amount less than the amount due (Example 444). This action may be interpreted by the bank as an action that increases the risk profile of customer C (406). Subsequently, the relative of customer C (406) is placed back on the contact list (Example 444). Customer C (406) may also be placed on the contact list for performing this action, however the relative of customer C (406) is be placed on the contact list in addition to customer C (406) him/herself because the bank may be unable to contact customer C (406) directly, and/or the bank wishes to exert more pressure on customer C (406).

In week 4 (416), customer C (406) modifies the scheduled payment amount to be an amount greater than the payment amount due (Example 446). This action is viewed as a positive action by the bank, and subsequently customer C's risk profile may be reduced. Accordingly, the relative of customer C (406) is removed from the bank's contact list (Example 446). Therefore, in week 5 (418), the relative of customer C (406) is not on the bank's contact list, and the bank does not contact the relative of customer C (406) (Example 448). The example of customer C (406) and the relative of customer C (406) represent a scenario in which the relative of a customer is initially on the bank's contact list because of actions performed by the customer, and is subsequently removed from the contact list due to a reduction in the risk profile of the customer. Those skilled in the art will appreciate that the aforementioned examples are representative of various scenarios not described, and that many other combinations of customer risk profiles, actions, and subsequent bank list removals or additions and customer/relative contact may be possible.

Figure 5:
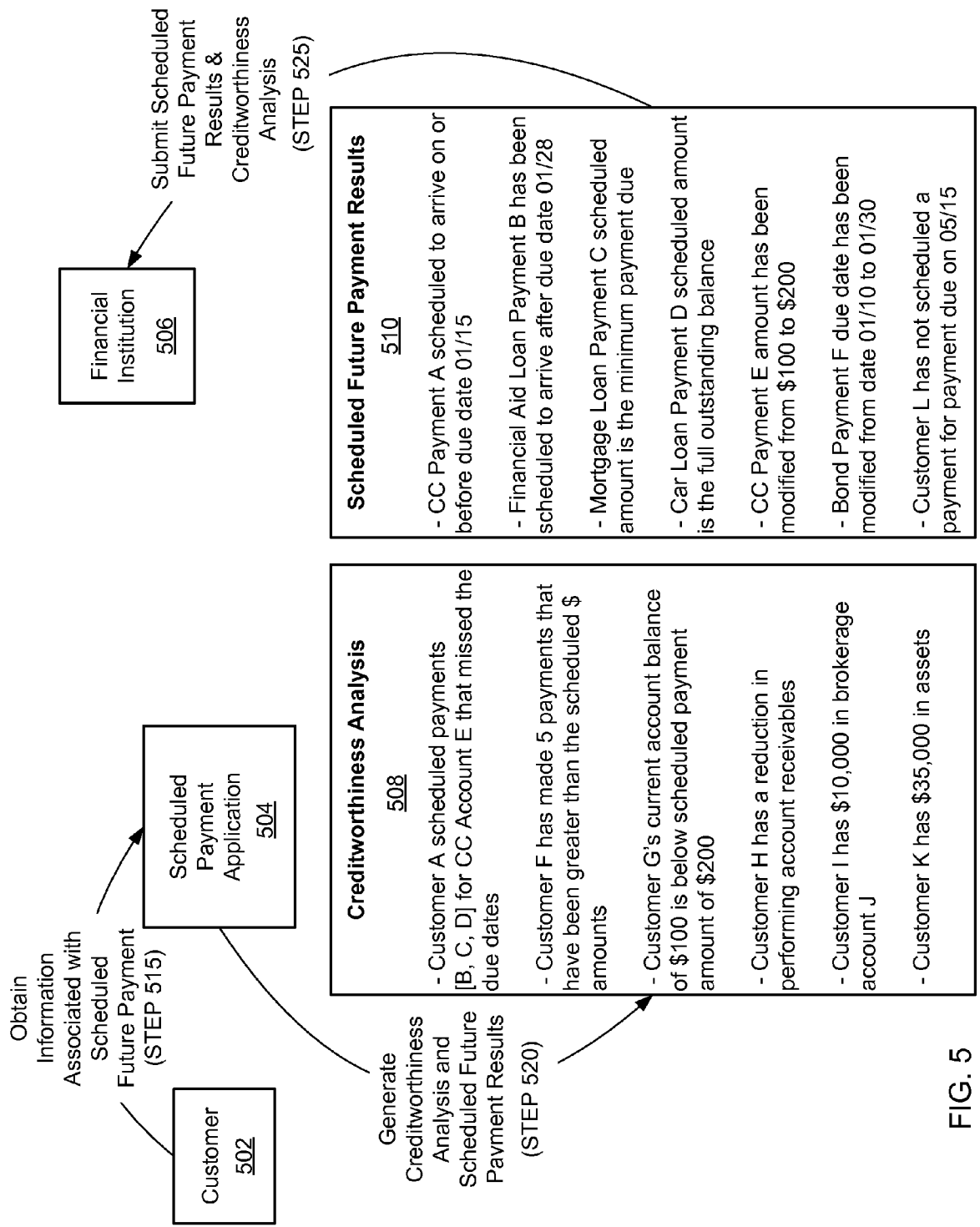

FIG. 5 shows an example in accordance with one or more embodiments of the invention. The process shown in FIG. 5 may be used, for example, with the system (100 in FIG. 1), to submit scheduled future payment results and creditworthiness analysis (e.g. via a notification) to a financial institution (Step 520). Those skilled in the art will appreciate that the sequence of steps shown in FIG. 5 may differ among embodiments of the invention, and that one or more of the steps may be optional.

In FIG. 5, the scheduled payment application (514) is configured to obtain information associated with a scheduled future payment (STEP 515) from a customer (502). The scheduled payment application (514) subsequently performs the actions described in FIG. 3B to generate a creditworthiness analysis (508) and scheduled future payment results (510) (STEP 520). Finally, scheduled future payment results and creditworthiness analysis are submitted to a financial institution (STEP 525). Please refer to FIG. 3B for description of the details of these actions.

In one or more embodiments of the invention, the creditworthiness analysis (508) may be composed of various types of analysis related to the creditworthiness and credit risk profile of a customer (502). The credit risk profile of a customer (502) may describe how risky the customer (502) is to a financial institution (506) with respect to potential for default on credit or loans. For example, the creditworthiness analysis (508) may include information indicating that customer A had previously scheduled payments B, C, and D for a credit card account E that had scheduled dates after the due dates of the payments. The creditworthiness analysis (508) may indicate that customer F has made five payments that have been greater than the scheduled payment amounts, or that customer G's current actual account balance (e.g. $100) is less than a scheduled payment amount (e.g. $200). For example, customer G's actual account balance may be an established source account (e.g. the account from which funds are withdrawn to pay off a credit card account at a destination account at a destination financial institution) at a source financial institution. In this case, a notification will be transmitted to the destination financial account to present this information.

The creditworthiness analysis (508) may also indicate that customer H has had a reduction in performing account receivables, and thus has a riskier credit profile than before. Further, the creditworthiness analysis (508) may indicate the amount of assets of customers; for instance, that customer I has $10,000 in liquid assets in a brokerage account J, or that customer K has a total of $35,000 in assets across multiple accounts.

Further, the creditworthiness analysis (508) may also indicate when certain events associated with a customer (502) have occurred that may affect the customer's risk profile, such as when a customer (502) has realized a reduced inventory cycle. Spending patterns may also be part of the creditworthiness analysis (508), such as when a customer (502) spends a certain percentage (e.g. 60%) of his/her disposable income on entertainment and discretionary shopping. If an existing customer has stopped using the scheduled payment application (504) to schedule upcoming payments or submit payments to a financial institution (506), or if a new customer is now using the payment application to schedule upcoming payments or submit payments to a financial institution (506), the creditworthiness analysis (508) may also include this information. Those skilled in the art will appreciate that the creditworthiness analysis (508) may be composed of various types of financial and credit risk analysis, which are appreciated, but not described herein.

In one or more embodiments of the invention, the scheduled future payment results (510) may include information related to various scheduled payments from a customer to a financial institution (506). For example, the scheduled future payment results (510) may indicate that a credit card payment A is scheduled to arrive on or before the payment due date (e.g. Jan. 15, 2009). The scheduled future payment results (510) may indicate that a financial aid loan payment B has been scheduled to arrive after the payment due date (e.g. Jan. 28, 2009). The scheduled future payment results (510) may also indicate that a scheduled mortgage loan payment C has a scheduled payment amount that is equivalent to the minimum required payment amount, or that a scheduled car loan payment D amount is equivalent to the full outstanding balance of the car loan. Further, the scheduled future payment results (510) may indicate that a scheduled credit card payment E amount has been modified from a first amount to a greater amount (e.g. $100 to $200), or that a bond payment F due date has been modified (e.g. from Jan. 10, 2009 to Jan. 30, 2009). Finally, the scheduled future payment results (510) may indicate that a customer L has not scheduled a payment for a payment that is due by a certain date (e.g. May 15, 2009). Those skilled in the art will appreciate that the scheduled future payment results (510) may be composed of various types of scheduled payment information, which are appreciated, but not described herein.

After the scheduled payment application (504) generates the creditworthiness analysis (508) and scheduled future payment results (510) (STEP 520), the scheduled payment application (504) may submit (e.g. transmit) the creditworthiness analysis and scheduled future payment results to a financial institution (506) (STEP 525). This submission may be performed using various transmission techniques, including email, direct electronic transmission, web page based transmission, and the like. Those skilled in the art will appreciate that there will be various means for transmitting information from the scheduled payment application (504) to the financial institution (506).

The invention may be implemented on virtually any type of computer regardless of the platform being used. For example, as shown in FIG. 6, a computer system (600) includes a processor (602), such as a central processing unit (CPU), associated memory (604), a storage device (606), and numerous other elements and functionalities typical of today's computers (not shown). The computer system (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., scheduled payment application, intermediate data repository, and the like) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device. Additionally, the resources of computer system (600) may be virtualized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting, to a first financial institution, information associated with a scheduled future payment to the first financial institution, comprising:
   receiving a request from the first financial institution for the information,
      wherein the scheduled future payment comprises an existing instruction from a customer to a second financial institution to initiate, at a future date, a transfer of funds to the first financial institution from an established source account at the second financial institution, in order to pay a debt associated with a credit card issued to the customer by the first financial institution;
   performing, by a computer processor and in response to the request, a search for the information on an intermediary data repository to obtain a result comprising an account number of the source account, a dollar amount of the scheduled future payment, and a payment date specifying the future date at which the scheduled future payment occurs,
      wherein the intermediary data repository is a data repository not controlled by the first financial institution or the second financial institution; and
   transmitting the result to the first financial institution.

2. The method of claim 1, further comprising:
   obtaining financial information related to creditworthiness;
   performing a creditworthiness analysis based on the financial information and the result; and
   transmitting the creditworthiness analysis to the first financial institution.

3. The method of claim 2, further comprising:
   obtaining a balance of the established source account at the second financial institution related to the information associated with the scheduled future payment;
   comparing the balance with the dollar amount;
   determining that the balance is less than the dollar amount; and
   generating a notification that the balance is less than the dollar amount, wherein the creditworthiness analysis comprises the notification.

4. The method of claim 2, further comprising:
   determining an expected balance of the established source account at the second financial institution related to the information associated with the scheduled future payment;
   comparing the expected balance with the dollar amount;
   determining that the expected balance is less than the dollar amount; and
   generating a notification that the expected balance is less than the dollar amount, wherein the creditworthiness analysis comprises the notification.

5. The method of claim 2, wherein the financial information comprises a payment made to the first financial institution in the past.

6. A system for transmitting, to a first financial institution, information associated with a schedule future payment to the first financial institution, comprising:
   a central processing unit (CPU);
   a scheduled payment application executing on the CPU and comprising:
      a scheduled payment input module configured to:
         receive a request from the first financial institution for the information,
         wherein the scheduled future payment comprises an existing instruction from a customer to a second financial institution to initiate, at a future date, a transfer of funds to the first financial institution from an established source account at the second financial institution, in order to pay a debt associated with a credit card issued to the customer by the first financial institution;
      an intermediary data repository coupled to the scheduled payment input module, not controlled by the first financial institution, and configured to:
         perform, in response to the request, a search for the information on an intermediary data repository to obtain a result comprising an account number of the source account, a dollar amount of the scheduled future payment, and a payment date specifying the future date at which the scheduled future payment occurs,
            wherein the intermediary data repository is a data repository not controlled by the first financial institution or the second financial institution; and
      a scheduled payment notification module coupled to the intermediary data repository and configured to:
         transmit the result to the first financial institution.

7. The system of claim 6, further comprising:
   a financial information analysis module coupled to the intermediary data repository and configured to:
      obtain financial information related to creditworthiness;
      perform a creditworthiness analysis based on the financial information and the result; and
      transmit the creditworthiness analysis to the first financial institution.

8. The system of claim 7, wherein the financial information analysis module is further configured to:
   obtain a balance of the established source account at the second financial institution related to the information associated with the scheduled future payment;
   compare the balance with the dollar amount;
   determine that the balance is less than the dollar amount; and
   generate a notification that the balance is less than the dollar amount, wherein the creditworthiness analysis comprises the notification.

9. The system of claim 7, wherein the financial information analysis module is further configured to:
   determine an expected balance of the established source account at the second financial institution related to the information associated with the scheduled future payment;
   compare the expected balance with the dollar amount;
   determine that the expected balance is less than the dollar amount; and
   generate a notification that the expected balance is less than the dollar amount, wherein the creditworthiness analysis comprises the notification.

10. The system of claim 7, wherein the financial information comprises a payment made to the first financial institution in the past.

11. A non-transitory computer readable medium storing instructions to transmit, to a first financial institution, information associated with a scheduled future payment to the first financial institution, the instructions executable on a central processing unit and comprising functionality to:
receive a request from the first financial institution for the information,
wherein the scheduled future payment comprises an existing instruction from a customer to a second financial institution to initiate, at a future date, a transfer of funds to the first financial institution from an established source account at the second financial institution, in order to pay a debt associated with a credit card issued to the customer by the first financial institution;
perform, in response to the request, a search for the information on an intermediary data repository to obtain a result comprising an account number of the source account, a dollar amount of the scheduled future payment, and a payment date specifying the future date at which the scheduled future payment occurs,
wherein the intermediary data repository is a data repository not controlled by the first financial institution or the second financial institution; and
transmit the result to the first financial institution.

12. The non-transitory computer readable medium of claim 11, the instructions further comprising functionality to:
obtain financial information related to creditworthiness;
perform a creditworthiness analysis based on the financial information and the result; and
transmit the creditworthiness analysis to the first financial institution.

13. The non-transitory computer readable medium of claim 11, the instructions further comprising functionality to:
determine an expected balance of the established source account at the second financial institution related to the information associated with the scheduled future payment;
compare the expected balance with the dollar amount;
determine that the expected balance is less than the dollar amount; and
generate a notification that the expected balance is less than the dollar amount, wherein the creditworthiness analysis comprises the notification.

14. The method of claim 1, further comprising:
determining that a portion of the information is modified; and
transmitting immediately the portion of the information to the first financial institution.

15. The method of claim 1, further comprising:
transmitting a payment comprising the dollar amount at the future date to the first financial institution.

16. The method of claim 1, further comprising:
modifying the information.

17. The method of claim 1, further comprising:
filtering a portion of the information from the intermediary data repository.

18. The method of claim 1, further comprising:
formatting a portion of the information from the intermediary data repository.

19. The method of claim 1, wherein the first financial institution adjusts a list comprising contact information of account holders based on the result.

20. The method of claim 1, wherein the information does not originate from the first financial institution.

21. The system of claim 6, further comprising:
a payment submission module coupled to the intermediary data repository and configured to:
transmit a payment comprising the dollar amount at the future date to the first financial institution.

22. The system of claim 6, wherein the scheduled payment notification module is further configured to:
determine that a portion of the information is modified; and
transmit immediately the portion of the information to the first financial institution.

23. The system of claim 6, wherein the intermediary data repository is further configured to filter a portion of the information.

24. The non-transitory computer readable medium of claim 11, the instructions further comprising functionality to:
determine that a portion of the information is modified; and
transmit immediately the portion of the information to the first financial institution.

25. The non-transitory computer readable medium of claim 11, the instructions further comprising functionality to transmit a payment comprising the dollar amount at the future date to the first financial institution.

* * * * *